United States Patent [19]

Grinstead

[11] Patent Number: 4,910,002
[45] Date of Patent: Mar. 20, 1990

[54] CYCLIC PROCESS FOR THE REMOVAL OF $NO_x$ AND $SO_x$ FROM GAS STREAMS USING A WATER-SOLUBLE, POLYMERIC CHELATE OF A POLYVALENT METAL AND MEMBRANE SEPARATION MEANS

[75] Inventor: Robert R. Grinstead, Walnut Creek, Calif.

[73] Assignee: The Dow Chemical Company, Midland, Mich.

[21] Appl. No.: 348,629

[22] Filed: May 8, 1989

[51] Int. Cl.[4] ................. C01B 21/00; C01B 17/00
[52] U.S. Cl. ................................ 423/235; 423/242
[58] Field of Search ............... 423/235, 235 D, 244 R, 423/244 A, 242 A, 242 R

[56] References Cited

U.S. PATENT DOCUMENTS

| | | | |
|---|---|---|---|
| 3,984,522 | 10/1976 | Saito et al. | 423/235 |
| 3,991,161 | 11/1976 | Saltoh et al. | 423/235 |
| 3,992,508 | 11/1976 | Saltoh et al. | 423/235 |
| 4,044,101 | 8/1977 | Hisamoto et al. | 423/235 |
| 4,055,623 | 10/1977 | Saltoh et al. | 423/235 |
| 4,079,118 | 3/1978 | Gorai | 423/235 |
| 4,081,509 | 3/1978 | Hishinuma et al. | 423/235 |
| 4,087,372 | 5/1978 | Saltoh et al. | 252/184 |
| 4,091,074 | 5/1978 | Gorai et al. | 423/235 |
| 4,113,837 | 9/1978 | Kendall et al. | 423/226 |
| 4,216,087 | 8/1980 | Long et al. | 210/58 |
| 4,347,227 | 8/1982 | Hass | 423/235 |
| 4,423,158 | 12/1983 | Porath | 521/32 |
| 4,448,899 | 5/1984 | Hass | 521/32 |
| 4,708,854 | 11/1987 | Grinstead | 423/235 |
| 4,778,664 | 10/1988 | Grinstead | 423/235 |

OTHER PUBLICATIONS

Ogundiran et al., "An Experimental Study of the Use of a Microporous Hollow Fiber Contactor for $SO_2$ Removal from Flue Gases", NAMS meeting, May 17-19, 1989—Abst. only.

Qi et al., "Microporous Hollow Fibers for Gas Absorption. I. Mass Transfer in the Liquid", *Journal of Membrane*, 23, 1985, pp. 321-332.

Kiani et al., "Solvent Extraction with Immobilized Interfaces in a Microporous Hydrophobic Menbrane", *Journal of Membrane Science*, 20, 1984, pp. 125-145.

Bedell et al., "Polymeric Iron Chelates for Nitric Oxide Removal from Flue Gas Streams", *Ind. Engr. Chem. Res.*, vol. 27, No. 11, 1988, pp. 2092-2095.

Primary Examiner—Gregory A. Heller

[57] ABSTRACT

The invention relates to a cyclic process for the removal of $NO_x$ and $SO_x$ from a gas stream containing $NO_x$ and $SO_x$. The gas stream is scrubbed with an aqueous reaction solution containing an organic, water-soluble, polymeric chelate containing a polyvalent metal ion. The $NO_x$ is absorbed and in the presence of $SO_x$, the imidodisulfonate is formed. The aqueous reaction solution containing chelate and imidodisulfonate is contacted with a first membrane separation means, wherein calcium oxide is added to the first permeate stream, resulting in the precipitation of calcium sulfite. The calcium sulfite is filtered from the first permeate stream, the first permeate stream combined with the first non-permeate stream, and the combined stream contacted with a second membrane separation means which removes a portion of the water and other low molecular weight materials, with recycle of the remaining non-permeate stream containing chelate to the scrubber. Water-soluble alkali is added to the process as needed.

15 Claims, 1 Drawing Sheet

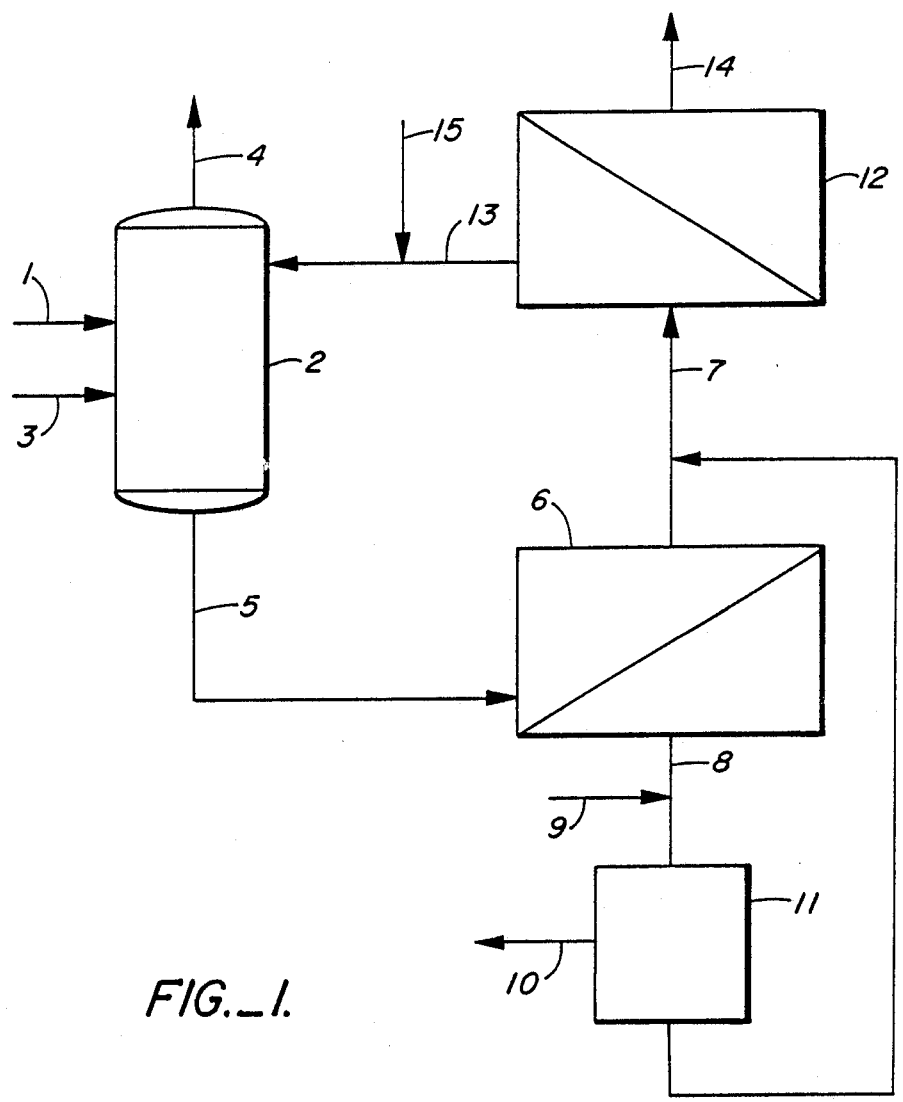
FIG._1.

CYCLIC PROCESS FOR THE REMOVAL OF $NO_x$ AND $SO_x$ FROM GAS STREAMS USING A WATER-SOLUBLE, POLYMERIC CHELATE OF A POLYVALENT METAL AND MEMBRANE SEPARATION MEANS

BACKGROUND OF THE INVENTION

This invention relates to a cyclic process for the removal of $NO_x$ and $SO_x$ from a gas stream using a water-soluble, polymeric chelate of a polyvalent metal and membrane separation means to recover and recycle the chelate for reuse.

The combustion of fossil fuels to generate electrical power commonly produces flue gases containing levels of $NO_x$ (nitrogen oxides) and $SO_x$ (sulfur oxides) which are environmentally harmful. $NO_x$ includes NO and $NO_2$; $SO_x$ includes $SO_2$ and $SO_3$. Typical flue gases may contain between about 10 and about 2000 ppmv $NO_x$ and between about 100 ppmv and 5.0 mole percent $SO_x$, with $SO_2$ constituting the primary contaminant. The emission levels of $NO_x$ and $SO_x$ are subject to both federal and state air quality control requirements. Methods of reducing $NO_x$ and $SO_x$ levels in flue gases include cleaning fuel to remove sulfur or switching to fuel containing less sulfur, controlling combustion conditions such as fuel/air ratio and temperature to minimize $NO_x$ formation, and flue gas clean-up through scrubbing.

Common methods of removing $SO_x$ from flue gases involve scrubbing with alkalis of calcium, magnesium, or sodium. Such methods generally are ineffective for removing $NO_x$ from flue gases. $NO_x$ in the presence of $SO_x$ may be removed from flue gases by absorbing the $NO_x$ in sulfite solutions containing iron salts to produce imidodisulfonates with subsequent hydrolysis to ammonium sulfate. $NO_x$ may also be removed by treating flue gases with a solution containing a water-soluble monomeric or polymeric iron chelate. Problems associated with these processes include inefficient separation of excess water, excess build-up of monomeric reaction products, loss of expensive chelates, and use of expensive water-soluble alkali.

What is needed is an inexpensive process for removing $NO_x$ and $SO_x$ from flue gases which removes excess water and monomeric reaction products, preserves chelates within the process, and utilizes inexpensive lime as the primary source of alkali within the process.

SUMMARY OF THE INVENTION

The invention is a cyclic process for the removal of $NO_x$ and $SO_x$ from a gas stream containing $NO_x$ and $SO_x$ comprising:

(A) contacting the gas stream containing $NO_x$ and $SO_x$ is a contacting zone with an aqueous reaction solution comprising: an effective amount of an organic, water-soluble, polymeric chelate, wherein the chelate contains a polyvalent metal capable of absorbing $NO_x$, wherein the chelate possesses a molecular weight between about 500 and about 1,000,000, and wherein the chelate comprises a repeating polymeric chain backbone with pendant organic chemical groups capable of chelating the metal, under conditions such that $NO_x$ and $SO_x$ are substantially removed from the gas stream as imidodisulfonate, sulfite, and other monomeric reaction products in the aqueous solution;

(B) separating the gas stream from which $NO_x$ and $SO_x$ have been substantially removed and the aqueous solution containing the chelate, imidodisulfate, sulfite, and other monomeric reaction products;

(C) contacting the aqueous solution of step (B) with a first membrane separation means to obtain:

(1) a first non-permeate stream, and
(2) a first permeate stream,
  (a) adding an effective amount of calcium oxide to the first permeate stream, resulting in the precipitation of substantially all of the sulfite as calcium sulfite,
  (b) removing the precipitated calcium sulfite from the first permeate stream by filtration, and
  (c) combining the first permeate stream from which calcium sulfite has been precipitated and filtered with the first non-permeate stream; wherein the combined stream contains sufficient remaining sulfite for reaction in the contacting zone of step (A);

(D) contacting the combined first permeate and first non-permeate stream with a second membrane separation means effective to remove as a second permeate stream a portion of the water and other monomeric reaction products which have a molecular weight of less than about 500 present in the combined first permeate and first non-permeate stream;

(E) recycling the second non-permeate stream comprising concentrated chelate containing aqueous solution to the contacting zone of step (A); and (F) adding an effective amount of water-soluble alkali to the cyclic process.

The inventive process removes substantially all $NO_x$ and $SO_x$ from flue gases while removing excess water from the process, removing excess monomeric reaction products from the process, preserving chelate within the process, and utilizing lime as the primary source of alkali within the process.

BRIEF DESCRIPTION OF THE DRAWINGS

FIG. 1 is a schematic representation of the inventive process.

DETAILED DESCRIPTION OF THE INVENTION

The invention is a cyclic process to remove $NO_x$ and $SO_x$ from gas streams utilizing a water-soluble, polymeric chelate of a polyvalent metal, membrane separation means, and lime as the primary source of alkali.

The gas stream containing $NO_x$ and $SO_x$ is contacted in a contacting zone with an aqueous reaction solution comprising an effective amount of an organic, water-soluble polymeric chelate, wherein the chelate contains a polyvalent metal capable of absorbing $NO_x$, wherein the chelate possesses a molecular weight between about 500 and about 1,000,000, and wherein the chelate comprises a repeating polymeric chain backbone with pendant organic chemical groups capable of chelating the metal.

The contacting zone comprises any suitable gas-liquid contacting equipment, for example, a packed column, a multi-plate column, a spray tower, or a venturi scrubber. The reactions of $NO_x$ and $SO_x$ in the gas stream with the aqueous reaction solution results in the formation of a number of monomeric reaction products, including imidodisulfonate. For example, when an iron chelate is used, the following set of reactions is believed to occur with NO and $SO_2$:

Fe(II)+NO+2SO$_2$+OH$^-$→HN(SO$_3$)$_2^{-2}$+½
S$_2$O$_6^{-2}$+Fe(III)+H$_2$O     (1)

SO$_2$+SO$_3^{-2}$+H$_2$O→2HSO$_3^-$     (2)

Fe(III)+SO$_3^{-2}$→Fe(II)+½S$_2$O$_6^{-2}$     (3)

Other reactions may occur.

The temperature within the contacting zone is such that the reactions of NO$_x$ and SO$_x$ in the gas stream react with the aqueous reaction solution in a reasonable time. The temperature is preferably in the range of from about 10° to about 90° C., more preferably in the range of from about 10° to about 60° C. The residence time within the contacting zone is such that the reactions of NO$_x$ and SO$_x$ in the gas stream with the aqueous reaction solution are substantially complete. Preferably the residence time in the contacting zone is less than about 15 minutes, more preferably less than about 5 minutes. The ratio of gas flowrate/aqueous reaction solution depends upon the concentration of NO$_x$ and SO$_x$ in the gas stream and the concentration of chelate in the aqueous reaction solution. Preferably the ratio of gas flowrate/aqueous reaction solution is in the range of from about 10 to about 1,000 SCFM/GPM. The concentration of chelate in the aqueous reaction solution is that which is sufficient to react with the NO$_x$ present in the gas stream. The concentration of chelate depends also on the particular chelate used. In the case of iron chelates, for example, the concentration of chelating groups is preferably in the range of from about 0.01 to about 0.5 Molar.

Any inert, water-soluble, polymeric chelate capable of chelating a polyvalent metal is suitable in the present process. Inert in this context is defined as not detrimentally reactive in the reaction to an intolerable extent. Polymeric chelates possessing a molecular weight between about 500 and about 1,000,000 are preferred in the present process. Polymeric chelates possessing a molecular weight between about 1000 and about 500,000 are more preferred.

Water-soluble polymeric chelates possessing a backbone chain with pendant groups capable of chelating polyvalent metals are preferred. More preferred water-soluble polymeric chelates possessing pendant polyvalent metal chelating groups include, for example, the following repeating polymeric groups:

—(CH$_2$—CH$_2$—N)$_m$—     (a)
    |
    X$_1$ wherein X$_1$ is independently in each occurrence —H, —CH$_2$COOH, —CH$_2$CH$_2$COOH, —CH$_2$—P(=O)(OH)$_2$, or

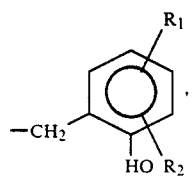

wherein
R$_1$ and R$_2$ are independently in each occurrence —CH$_3$, —SO$_3$H, —Cl, —H, —COOH; and
m is an integer between about 5 and about 20,000;

—(CH$_2$—CH$_2$N)$_m$—     (b)
    |
    X$_2$ wherein
X$_2$ is independently in each occurrence —H, —CH$_2$CH(OH)CH$_2$OH, —CH$_2$CH(OH)CH$_2$Cl, or

R$_3$, R$_4$ and R$_5$ are independently in each occurrence X$_1$, wherein X$_1$ is as defined hereinabove;
m is an integer between about 5 and about 20,000; and
n is 0, 1, 2, 3 or 4;

—(CH$_2$—CH—O)$_r$—     (c)
     |
     CH$_2$
     |
     X$_3$ wherein
X$_3$ is independently in each occurrence —OH, —Cl, or

R$_3$, R$_4$ and R$_5$ are as defined hereinabove;
r is an integer between about 10 and about 20,000, and
s is an integer between about 1 and about 4;

—(CH$_2$—CH)$_t$—     (d)
     |
     C=O
     |
     X$_4$ wherein
X$_4$ is independently in each occurrence —OH, —OCH$_3$, —OCH$_2$CH$_3$, or

R$_3$, R$_4$ and R$_5$ are as defined hereinabove;
t is an integer between about 10 and about 20,000, and
u is an integer between about 1 and about 4;

—(CH$_2$—CH)$_p$—     (e)
     |
     |
     CH$_2$—X$_5$ wherein $X_5$ is independently in each occurrence —OH, —Cl, or

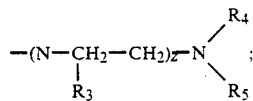

$R_3$, $R_4$ and $R_5$ are as is defined hereinabove;
y is an integer between about 10 and about 20,000, and
z is an integer between about 1 and about 4;

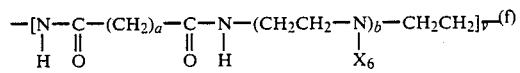

wherein
$X_6$ is independently in each occurrence —H, —CH$_2$CH(OH)CH$_2$OH, —CH$_2$CH(OH)CH$_2$Cl, or

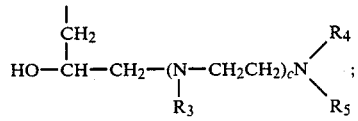

$R_3$, $R_4$ and $R_5$ are as defined hereinabove;
v is between about 10 to about 10,000,
a is about 6,
b is between about 1 and about 4, and
c is between about 1 and about 4;

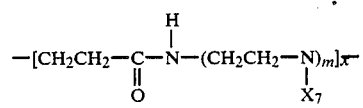    (g)

wherein
$X_7$ is independently in each occurrence —H, —CH$_2$CH(OH)CH$_2$OH, —CH$_2$CH(OH)CH$_2$Cl, or

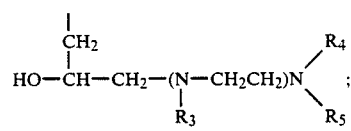

m, x, and n and $R_3$, $R_4$ and $R_5$ are as defined hereinabove; or

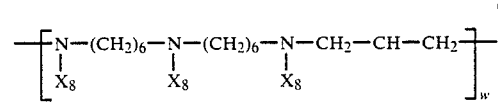    (h)

wherein $X_8$ is independently in each occurrence —H, —CH$_2$CH(OH)CH$_2$Cl, —CH$_2$CH(OH), or —CH$_2$,

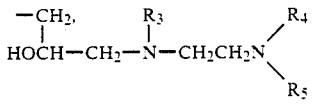

wherein
$R_3$, $R_4$ and $R_5$ are as defined hereinabove; and
w is between about 2000 and about 4000.

Mixtures of the organic water-soluble polymeric chelates described hereinabove are also useful in the present invention.

A more detailed description of the preparation of the hereinbefore described water-soluble organic polymeric chelates is provided below and as part of the Examples. Some polyamines and polyethers used in synthesis are described in Table 1.

TABLE 1

POLYAMINES USED AS STARTING MATERIALS FOR POLYCHELATOR SYNTESIS

| Amine[a] | Degree of Polymerization (D.P.) | Molecular Weight Range | Nature of Chain |
|---|---|---|---|
| E-100[b] 2 | 67.5 | 250–3000.28 | Branched much floc. |
| PEI-6 | 154 | 6007.3 | Branched |
| Hydrolyzed PEOx | 50[c] | 2000 | Linear |
| Purifloc C-31[d] | 500 | 10,000–30,000 | Branched |
| Hydrolyzed PEOx | 500[f] | 20,000 | Linear |
| PEI-600 | 1500 | 60,000 | Branched |
| Hydrolyzed PEOx | 5000[g] | 500,000 | Linear |

[a]PEI = polyethyleneimine; PEOx, polyethyloxazoline. PEI is a polymer of molecular weight 60,000 (CORCAT 600) and is obtained from Cordova Chemical Company. The nitrogen content is determined by driving a sample and elemental analysis of the solid.
[b]E-100 — is a byproduct of ethylenediamide manufacture and is a low molecular weight branched polymer containing about six ethyleneamine groups.
[c]100 percent hydrolized.
[d]Purifloc C-31 — is a polyethylene amine product of the Dow Chemical Company, Midland, Michigan.
[e]Probably also partially crosslinked.
[f]85 percent hydrolyzed.
[g]97 percent hydrolyzed.

One embodiment of the chelate designated (a)

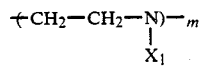

wherein $X_1$ is —H or —CH$_2$COOH (CHELATE A) is prepared by dissolving polyethyleneimine (CORCAT 150 or CORCAT 600, available from the Cordova Chemical Company) in water, followed by reaction with excess sodium chloroacetate in the presence of strong base.

Another embodiment of the polymeric chelate designated (a)

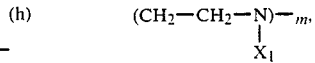

wherein $X_1$ is —H or —CH$_2$P(=O)(OH)$_2$ (CHELATE B) is prepared by dissolving polyethyleneeimine in water and reacting with phosphoric acid and formaldehyde. The process described by R. S. Mitchell in U.S.

Pat. No. 3,974,090 for the monomer may be adapted using the polymeric imine.

A further embodiment of the polymeric chelate designated (a)

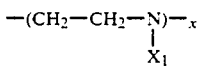

wherein $X_1$ is —H or

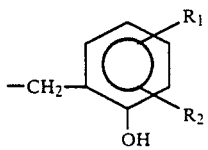

and $R_1$, $R_2$ are each methyl (CHELATE C) is obtained by dissolving polyethyleneimine in water followed by treatment with 2,4-dimethylphenol and formaldehyde. The general procedure described by G. Grillot and W. Gormley, Jr., J. Amer. Chem. Soc., Vol. 67, pp. 1968ff (1945) for the monomer is adapted using the polymeric imine.

One embodiment of the polymeric chelate designated (b) wherein $X_2$ is —H or —CH$_2$CH(OH)CH$_2$NR$_3$CH$_2$CH$_2$—NR$_4$R$_5$ and $R_3$, $R_4$, $R_5$ are each independently —CH$_2$COOH and n is 1 (CHELATE D) is obtained by first reacting triacetic acid to produce epichlorohydrin,

with ethyelendiamine

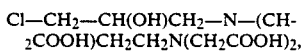

followed by reaction with polyethyleneimine. The procedure described a ove, for CHELATE A, may also be adapted. For those polymers wherein n is 2, 3 or 4, the ethylenedimaine is replaced with the corresponding diethylenetrimaine, triethylenetetraamine, or tetraethylene-pentamine, respectively.

Another embodiment is of the polymeric chelate designated (b) wherein p is about 20,000, q is O, $X_2$ is —H or —CH$_2$CH(OH)CH$_2$NR$_3$CH$_2$CH$_2$—NR$_4$R$_5$ and $R_3$, $R_4$, $R_5$ are each independently —CH$_2$COOH (CHELATE D-1), iminodiacetic acid is dissolved in water and epichlorohydrin, about a 20 percent excess is added. The product is extracted with a chlorinated hydrocarbon such as methylene chloride to remove the unreacted epichlorohydrin. To this aqueous solution is added a 33 percent aqueous solution of polyethyleneimine, e.g., CORCAT 600. The solution is heated and further treated with sodium hydroxide at a pH of 9–10. The chelate solution is used without further purification.

One embodiment of the polymeric chelate designated (c) wherein $X_3$ is —OH or —(NRCH$_2$)NR$_4$R$_5$ and $X_4$ is —OH or —NHCH$_2$CH$_2$NR$_3$CH$_2$CH$_2$NR$_4$R$_5$, and $R_3$, $R_4$, $R_5$ are each independently —CH$_2$COOH (CHELATE E) is prepared by treating polyepichlorohydrin with ethylenediamine in the presence of base followed by treatment with excess sodium chloroacetate.

One embodiment of the chelate designated (d) wherein t is 100, u is 1, $X_4$ is —OH or —NHCH$_2$CH$_2$NR$_3$CH$_2$CH$_2$NR$_4$R$_5$, and $R_3$, $R_4$, $R_5$ are each independently —CH$_2$COOH (CHELATE F) is prepared by the treatment of poly(ethylacrylate) with diethylenetriamine followed by treatment with sodium chloroacetate in the presence of a strong base.

One embodiment of the chelate designated (e) wherein $X_5$ is —OH or —NR$_3$CH$_2$CH$_2$NR$_4$R$_5$ and $R_3$, $R_4$, $R_5$ are each independently —CH$_2$COOH, y is 100 and z is 1 (CHELATE G) is the treatment of poly(vinylbenzylchloride) with ethylenedimaine in he presence of strong base. The product in the presence of base is then treated with excess sodium chloroacetate. By replacement of ethylenedimaine with diethylenetrimaine, triethylene tetraamine, ahd the like, the higher homologs are produced.

One embodiment of the chelate designated (f) wherein $X_6$ is —H or —CH$_2$CH(OH)CH$_2$NR$_3$—CH$_2$CH$_2$NR$_4$R$_5$ and $R_3$, $R_4$, $R_5$ are each independently —CH$_2$COOH and e is 1 (CHELATE H) is obtained by the treatment of the commercial polymer KYMENE 557H which is obtained from the Hercules Corporation of Wilmington, Del., with ethylenediamine triacetic acid.

One embodiment of the chelate designated (g) where $X_7$ is —H or —CH$_2$CH(OH)CH$_2$NR$_3$CH$_2$CH$_2$NR$_4$R$_5$ and $R_3$, $R_4$, $R_5$ are each independently —CH$_2$COOH and n is 0 (CHELATE J), is obtained by reacting the polymer of methylacrylate and ethylenediamine with the epoxide adduct formed by the treatment of iminodiacetic acid with epichlorohydrin.

One embodiment of the chelate designated (h) wherein $X_8$ is —H, —CH$_2$CH(OH)CH$_2$OH, or —CH$_2$CH(OH)CH$_2$NR$_3$CH$_2$CH$_2$NR$_4$R$_5$ and $R_3$, $R_4$, $R_5$ are each independently CH$_2$COOH, is obtained by reacting the commercially available FIBRABON 35 from the Diamond Shamrock Co., Cleveland, Ohio with ethylenediaminetriacetic acid in the presence of base (CHELATE K).

A more detailed description of the preparation for these organic water-soluble polymeric chelates is provided as part of the Examples.

Generally, any polyvalent metal can be used in the present invention as the metal component of the polymeric chelate to remove NO. Iron, copper, cobalt, and manganese are preferred. Iron is especially preferred. The polyvalent metal chelate should be capable of acting as a catalyst to instantaneously complex NO and should then be capable of regeneration.

The gas stream from which NO$_x$ and SO$_x$ have been substantially removed is separated from the aqueous solution containing the chelate, imidodisulfonate, and other monomeric reaction products. The aqueous solution is contacted with a first membrane separation means to obtain a first non-permeate stream and a first permeate stream. An effective amount of calcium oxide (lime) is added to the first permeate stream to precipitate substantially all of the sulfite present in the first permeate stream as calcium sulfite. The amount of calcium oxide added depends upon the concentration of sulfite in the first permeate stream; 1 mole of calcium oxide is required to precipitate 1 mole of sulfite as calcium sulfite. The calcium sulfite precipitate is removed from the first permeate stream by filtration. The first permeate stream is then combined with the first non-permeable stream. The sulfite remaining in the combined first permeate and first non-permeate stream should be sufficient for reaction in the $NO_x$ and $SO_x$ containing gas stream/aqueous reaction solution contacting zone. Preferably this results in about 15 to about 70 volume percent, more preferably about 30 to about 70 volume percent, of the aqueous solution passing through the recycle loop as the first permeate stream.

The first membrane separation means is preferably ultrafiltration or dialysis, more preferably ultrafiltration. The membranes useful in this invention may be in flat sheet, tubular, or hollow fiber form. The membranes are formed from polymers which are not deleteriously affected under conditions of use, for example, polysulfones, polyethersulfones, polyamides, cellulosic polymers, polyetherketones, polyolefins, polycarbonates, polyesters, polyestercarbonates, and the like. The membranes preferably possess a molecular weight cut-off such that substantially all of the chelate is retained in the first non-permeate stream. The molecular weight cutoff of the membrane will therefore depend upon the molecular weight of the chelate used. The molecular weight cutoff of the membranes useful in this invention preferably is in the range of about 500 to about 30,000. The water flux through the membrane should occur at reasonable rates while retaining substantially all of the chelate in the non-permeate stream. The water flux through the membranes is preferably in the range of about 5 to about 100 GFD. The membrane separation occurs at temperatures and pressures which do not deleteriously affect the membrane. The membrane separation temperature is preferably from about 0° to about 90° C., more preferably from about 10° to about 60° C., even more preferably from about 10° to about 45° C. The membrane separation pressure is preferably from about 5 to about 100 psi.

The combined first permeate and first non-permeate stream is contacted with a second membrane separation means to remove a portion of the water and monomeric reaction products in a second permeate stream and to recover substantially all of the chelate in the second non-permeate stream which is recycled to the $NO_x$ and $SO_x$ containing gas stream/aqueous reaction solution contacting zone for reuse. Preferably this results in about 5 to about 25 volume percent of the combined first permeate and first non-permeate stream being withdrawn as a second permeate stream. The second membrane separation means and the conditions of membrane separation are as described for the first membrane separation means.

An effective amount of water-soluble alkali is added to the cyclic process. The water-soluble alkali is preferably added to the cyclic process at a point just prior to or within the $NO_x$ and $SO_x$ containing gas stream/aqueous reaction solution contacting zone. The water-soluble alkali may be for example $Na_2CO_3$ (soda ash) or NaOH. The water-soluble alkali is added in an amount sufficient for the reactions in the contacting zone.

DETAILED DESCRIPTION OF THE DRAWINGS

In FIG. 1, the $NO_x$ and $SO_x$ containing gas stream (1) is introduced into the gas stream/aqueous reaction solution contacting zone (2). Fresh or make-up aqueous reaction solution (3) may be introduced into the contacting zone (2). The purified gas stream (4), substantially free of $NO_x$ and $SO_x$, is separated from the aqueous solution and is removed from the gas stream/aqueous reaction solution contacting zone (2). The aqueous solution containing chelate, iminodisulfonate, and other monomeric reaction products (5) is passed to a first membrane separation means (6) in which the aqueous stream (5) is split into a first non-permeate stream (7) and a first permeate stream (8). Calcium oxide (9) is added to the first permeate stream (8), resulting in the precipitation of calcium sulfite (10) which is removed from the first permeate stream (8) by filtration (11). The first permeate stream from which substantially all of the sulfite has been removed is then recombined with the first non-permeate stream (7). The combined first permeate and first non-permeate stream is passed to second membrane separation means (12) which separates the combined first permeate and first non-permeate stream into a second non-permeate stream (13) and a second permeate stream (14). Substantially all of the chelate remains in the second non-permeate stream (13) which is recycled back to the gas/stream aqueous reaction solution contacting zone (2). The second non-permeate stream (14) removes excess water and monomeric reaction products from the process. Water-soluble alkali (15) may be added to the process just prior to or within the gas stream/aqueous reaction solution contacting zone (2).

SPECIFIC EMBODIMENTS

The following Examples are to be construed as being illustrative and are not to be limiting in any way.

EXAMPLE 1

Preparation of Polymeric Chelate (a) Based on Polyethyleneimine (PEI)

[CHELATE A]

(a) Polyethyleneimine, about 11 grams, degree of polymerization (DP) 1500, dissolved in water (about 200 ml) to produce a solution of about 1.25 molar (in amine nitrogen). To the aqueous solution is added sodium chloroacetate (about 31 grams, a 5 percent excess) with stirring while maintaining the reaction mixture at about 60° C. A pH electrode is used to monitor the reaction and about 50 weight percent sodium hydroxide is added to maintain the pH above about 10. After 40 minutes of reaction the reaction is complete, and the reaction mixture is allowed to cool. The aqueous solution is diluted to about 1.0M (amine nitrogen) and used without further purification.

EXAMPLE 1A

Preparation of Polymeric Chelate (a)

[CHELATE B]

To a 500 ml flask equipped with a water condenser and dropping funnel is added about 99 grams (0.6 mole) of about 49.9 weight percent ortho-phosphorus acid (which also contains about 9.4 grams of hydrogen chloride) and about 5.2 grams of about 37 weight percent hydrochloric acid. The total moles of hydrogen chloride used is about 0.4. The resultant mixture is then allowed to heat by the addition of about 14 grams of CORCAT 150 (Cordova Chemical Co.) as an about 33 weight percent aqueous solution of polyethyleneimine containing 0.1 mole of amine nitrogen. The polyamine is added over a period of about 8 to about 10 minutes while the reaction mixture achieves a temperature of about 70°–75° C. The reaction mixture is then heated for about 20 minutes to the boiling temperature, thereby producing a homogeneous clear solution having a boiling point of between about 110°–115° C. The resulting clear aqueous solution is maintained at boiling for about 2 hours, and about 22 grams (0.66 mole) of paraformaldehyde is added. After about 2 hours, the clear reaction mixture is kept boiling for about an additional 30 minutes and cooled to about 25°-30° C. The clear solution has an amber color, and contains about 50 weight percent of the polyethyleneimine phosphonate which is used without further purification.

EXAMPLE 1B

Preparation of Polymeric Chelate (a)

[CHELATE C]

To about a 13 gram aqueous soluton (33 weight percent) of polyethyleneimine CORCAT 150 (from Cordova Chemical Company) containing 0.1 mole of available amine nitrogen is added about 10.8 grams of p-cresol (0.1 mole). The solution is maintained below about 20° C., while about a 37 weight percent aqueous formaldehyde solution (0.11 mole) is added slowly with stirring. The solution is allowed to stand for about an hour at ambient temperature and then warmed to about 80° C. for about 2 hours. The aqueous solution is used without purification in subsequent experiments.

EXAMPLE 2

Preparation of Polymeric Chelate (b)

[CHELATE D]

This preparation is performed in two steps: (1) attachment of ethylenediamine to the polymer; and (2) conversion of the amine to the ED3A.

Step 1: About 23.5 grams of polyepichlorohydrin (0.25 Mole monomer unit) and about 94 grams of about 85 weight percent ethylenediamine (1.3 moles) are dissolved in about 50 ml isopropanol and about 25 ml of toluene and refluxed at about 100° C. for about six hours. As the reaction proceeds, additional isopropanol is added to maintain homogeneity, with the final system being about 75/25 weight percent isopropanol/toluene. The reaction is followed by titrating aliquots for chloride ion with silver nitrate. Next, about 20 grams of about 50 weight percent NaOH (0.25 mole) is added, the solid NaCl formed is filtered, washed with ethanol, and the liquid is removed in a vacuum evaporator at about 55° C. Although some NaCl remains in the product, the elemental analysis gives a C:H:N mole ratio of about 4.6:12.1:2.00 (expected mole ratio is 5:12:2).

Step 2: This intermediate is taken up in about 200 ml of water, to which about 3.3 moles of sodium chloroacetate is added per mole of nitrogen. The system is kept to about 60° C. and a pH of about 10 for about one hour. At this point, a white precipitate (presumably NaCl) is filtered off, the pH is adjusted to about 2 (the expected isoelectric point), at which point considerable white solid forms. This solid is filtered and found to be EDTA, presumably formed because all of the unreacted ethylenediamine had not been removed during the vacuum evaporation. The filtrate is dialyzed against about 4 liters of water.

An estimate of the ethylenediaminetriacetic acid content of the dialyzed (polymeric) material is made by titrating an aliquot with iron (III). About one-third of the expected chelant groups are found in the polymer fraction.

EXAMPLE 2A

Preparation of Polymeric Chelate (b)

[CHELATE D-1]

About 14.3 grams (0.1 mole) of iminodiacetic acid is dissolved in about 100 ml of water. To this solution is added about 0.12 mole epichlorohydrin, about a 20 percent excess. After allowing the solution to stand for about an hour at ambient temmperature, it is extracted with about 50 ml of methylene chloride to remove the unreacted epichlorohydrin. To the aqueous phase from this extraction is added about 14.7 grams of about a 33 weight percent solution of polyethyleneimine CORCAT 600 (Cordova Chem. Co., Muskegon, Mich.), an amount determined to contain 0.1 mole of nitrogen. The solution is heated to about 60° C., while sodium hydroxide solution (10N) is added at a rate sufficient to maintain the pH in the range of about 9-10. After about 30 minutes, the reaction is complete and the resulting solution, which now contains the polyethyleneimine with iminodiacetic acid groups attached to it, is used without purification in subsequent experiments.

EXAMPLE 3

Preparation of Polymeric Chelate (c)

[CHELATE E]

About 22.4 grams (0.1 mole) of ethylenediamine triacetic acid is dissolved in about 100 ml of water. To this solution is added about 0.12 mole of polyepichlorohydrin (HYDRIN 10×1 DP~40), (B. F. Goodrich, Cleveland, Ohio), about a 20 percent excess in 100 ml of toluene/methylene chloride (50/50; v/v). To this two-phase solution is added 0.01 mole to tetrabutyl ammonium chloride as a phase transfer catalyst. The solution is allowed to stir vigorously for about an hour at ambient temperature. The HCl produced is taken up by the addition of sodium hydroxide. The aqueous polymeric chelate is subsequently used without purification.

EXAMPLE 4

Preparation of Polymeric Chelate (d)

[CHELATE F]

Poly(methylacrylate), about 86 grams, equivalent to one mole of formula weight of the monomeric methyl acrylate, is dissolved in about 300 ml of toluene, and about 520 grams of diethylenetriamine (5 moles) are added. The solution is heated to about 40°-50° C. for about an hour and the excess amine and toluene are evaporated under vacuum. The residue is taken up in about 500 ml of water and about 348 grams of sodium chloroacetate (3.0 mol) are added to the solution, and heated to about 60° C. for about 30 minutes while sodium hydroxide is added at a rate sufficient to maintain the pH at about 9-10. This solution, which has the desired structure, is used without further purification in subsequent experiments.

EXAMPLE 5

Preparation of Polymeric Chelate (e)

[CHELATE G]

Polyvinylbenzyl chloride, about 15 grams, equivalent to 0.1 mole of monomer units, is dissolved in about 100 ml of methylene chloride, and about 30 grams of ethylene diamine (0.5 mole) are added. The solution is warmed to about 40° C. and stirred for about 2 hours. The excess amine and methylene chloride are evaporated under vacuum. The resulting polymer is taken up in about 200 ml of water and carboxymethylated as in the preceding example. The resulting polymer has the desired structure and is used further without purification.

EXAMPLE 6

Preparation of Polymeric Chelate (f)

[CHELATE H]

About 80 grams of the polymer KYMENE 557H (0.1 mole monomer equivalent) (Hercules Corporation, Wilmington, Del.), which is a copolymer of adipic acid, diethylenetriamine and epichlorohydrin, is added to a solution of about 46 grams of ethylenediaminetriacetic acid in about 200 ml of water (a twofold excess). The solution is heated to about 80° C. for about two hours. The resulting solution, which contains the desired polymer (vi), is used without further purification in subsequent experiments.

EXAMPLE 7

Preparation of Polymeric Chelate (g)

[CHELATE J]

A solution of an adduct of epichlorohydrin and iminodiacetic acid, as prepared in Example 2A, is added to an equimolar quantity of a polymer solution made by reacting equimolar quantities of methyl acrylate and ethylenediamine. The solution is heated to 80° C. for about 2 hours and the resulting polymer is used in subsequent experiments.

EXAMPLE 8

Preparation of Polymeric Chelate (h)

[CHELATE K]

About 54 grams of the commercial polymer FIBRABON 35 (Diamond Shamrock Corporation, Cleveland, Ohio), which contains 100 millimoles of active epichlorohydrin groups, is mixed with a solution of about 46 grams of ethylenediaminetriacetic acid (0.2 mole). The solution is heated to about 60° C. and sodium hydroxide is added at a rate sufficient to maintain the pH at about 9-10. After about 2 hours, the reaction is complete, and the solution is used in subsequent experiments.

EXAMPLE 9

Chelation of Iron (II) by Polymeric Chelating Agents

Various polymeric chelates are obtained by treating the polymeric chelant with iron at pH 7. The results of these reactions is shown in Table II.

TABLE II
CHELATION OF IRON (II) BY POLYMERIC CHELATING AGENTS
Ratio W is the mole ratio of nitrogen in chelating monomer or polymer to iron at point of incipient precipitation at room temperature. pH in all tests is 7 ± 0.5.

| Chelator | (Fe), Molar | W |
|---|---|---|
| EDTA | 0.03 | 2.0 |
| MBEDTA | 0.03 | 2.2 |
| Sym. EDDA | 0.03 | 10 |
| DTDA | 0.015 | 9 |
| DTPA | 0.03 | 2.5 |
| TTHA | 0.05 | 2.3 |
| CM E-100 | 0.04 | 3.4 |

TABLE II-continued
CHELATION OF IRON (II) BY POLYMERIC CHELATING AGENTS
Ratio W is the mole ratio of nitrogen in chelating monomer or polymer to iron at point of incipient precipitation at room temperature. pH in all tests is 7 ± 0.5.

| Chelator | (Fe), Molar | W |
|---|---|---|
| CM PEI 6 | 0.045 | 3.2 |
| CM PEOx, DP-50 | 0.025 | 5 |
| CM PEOx, DP-1000 | 0.025 | 4 |
| CM PEOx, DP-10,000 | 0.015 | 4.2 |
| CM C-31 (Dow Chemical) | 0.04 | 5 |

EDTA - Ethylenediamine tetracetic acid
MBEDTA - Methyl-p-benylethylenediaminetriacetic acid
Sym. EDDA - Sym. Ethylenediaminediacetic acid
DTPA - Diethylenetetraaminepentaacetic acid
DTDA - Diethylenetriaminediacetic acid
TTHA - Triethylenetetraaminehexaacetic acid
CM - Carboxymethyl
PEI - Polyethyleneimine
PEOx - Polyethyleneoxazoline

EXAMPLE 10

NO Absorption Using Polymeric Chelate of Iron (II)

A number of polymeric chelates containing iron (II) are treated with NO in aqueous solution. The results are shown in Table III, wherein the mole ration of NO to iron (II) is shown. The polymeric chelates absorb NO to an extent comparable to the monomeric chelates.

TABLE III
NITRIC OXIDE ABSORPTION BY IRON (II) CHELATES

| Chelator | Mole Ratio, N/Fe | Final pH | NO Absorbed mol/mol Fe | Appearance of Final System |
|---|---|---|---|---|
| None | — | 6.8 | 0.03 | ppt. present |
| HEIDA | 1 | 7.6 | 0.1 | some blue floc. |
| Sym. EDDA | 2 | 7.2 | 0.4 | much blue floc. |
| EDTA | 2 | 7.1 | 0.067 | clear, brown-green |
| HEDTA | 2 | 6.8 | 0.37 | clear, brown-green |
| DTDA | 3 | 7.0 | 0.23 | clear, brown-green |
| DTDA | 3 | 7.2 | 0.37 | much blue floc. |
| DTPA | 3 | 7.5 | 0.007 | clear, yellow |
| TTHA | 2 | 6.3 | 0.20 | clear |
| CM E-100 | 2 | 6.8 | 0.07 | much blue floc. |
| CM E-100 | 4 | 6.7 | 0.07 | clear |
| CM PEI 6 | 2 | 7.4 | 0.17 | much floc. |
|  | 3 | 7.2 | 0.10 | much floc. |
|  | 4 | 7.0 | 0.10 | clear, brown-green |
|  | 18 | 7.1 | 0.03 | clear, yellow-green |
| CM PEOx, DP 50 | 2 | 7.2 | 0.13 | much floc. |
|  | 2 | 7.5 | 0.28 | much floc. |
|  | 4 | 7.3 | 0.07 | small amount floc. |
| CM PEOx, DP 500 | 2 | 6.6 | 0.03 | no observ. |
| CM C-31 | 2 | 6.7 | 0.08 | much floc. |
| CM C-31 | 4 | 7.1 | 0.07 | clear |

Reaction conditions:
120 ml of 0.025 M Fe(II) sulfate.
Temperature 55° C.
Gas flow: 1.2 liters/min. nitrogen containing 250 ppm NO.

EXAMPLE 11

Dialysis of Iron Polymeric Chelating Agents

In the dialysis, about 100 ml of iron (II) organic chelate, made up to be about 0.1 molar in iron, is dialyzed into two liters of deionized water overnight. The CM PEI 150 and CM PEI 600 polymeric chelating agents are dialyzed through a SPECTROPOR 1 membrane, available from Van Waters & Rogers, San Francisco, Calif., which has a nominal molecular weight cut-off of about 6000-8000. In both cases, about 3-5 weight percent of the iron is lost. The CM PEI 6 solution is dialyzed through a SPECTROPOR 6 membrane (Van Waters & Rogers) which has a cut-off of about 2000. In this case about 10 weight percent of the iron is lost.

EXAMPLE 12

Ultrafiltration of Iron Polychelates

The ultrafiltration tests are performed in an Amicon Model 52 cell which is a cylindrical chamber with a 43 mm diameter membrane as the bottom surface. The cell volume is about 60 ml and the cell contains a suspended magnetic stirring bar to reduce polarization effects. In a run, about a 25-ml volume of solution is placed in the cell and the gas space is connected to an air line maintained at 15 psi.

Three membranes are used for this study, all obtained from the Amicon Corporation of Danvers, Mass. They are designated as UM 05, UM 2 and PM 10, having nominal molecular weight cutoffs of 500, 1000 and 10,000, respectively. The iron is determined by the standard thiocyanate method.

The results are shown in Table IV.

TABLE IV
ULTRAFILTRATION AND DIALYSIS OF IRON POLYCHELATES

| Poly-chelator | UM 05 Rejection % | UM 2 Rejection % | UM 2 Flow *GFD | PM 10 Rejection % | PM 10 Flow *GFD |
|---|---|---|---|---|---|
| CM PEI 600 | 89 | 98 | 1.3 | 91 | 6 |
| CM PEI 600 (dialyzed) | | 99 | 2.8 | 95 | 16 |
| CM PEI 150 (dialyzed) | | 95 | 1.4 | 97 | 9 |
| CM PEI 6 | | 80-90 | 0.8 | 25 | 28 |
| CM PEI 6 (dialyzed) | 61 | 90 | <0.3 | | |
| CM E-100 | 84 | 92 | 0.6 | 27 | 40 |
| EDTA | 23 | 10 | 1 | | |
| Deionized $H_2O$ only | | | 5 | | 100 |

[CM PEI —Carboxymethyl polyethyleneimine, etc.]
Rejection % values are averages over steady state portion of run.
Flow values are interpolated or extrapolated to 0.10 M Fe.
Rejection percent —the amount of chelate (or material) which did not pass through the membrane.
*GFD = gal (ft$^2$ × day)

As can be seen from Table IV, polychelates based on carboxymethylated polyethyleneimine 6 (CM PEI 6, about 15 onomer units) or larger polymers are fairly well rejected by ultrafiltration membranes having cutoffs in the molecular weight range of 1000-10,000. CM PEI 6 is strongly rejected (80-90 percent) by Amicon UM 2 membrane (having a cut-off value of 1000), but poorly (20-30 percent) by PM 10 (cut-off 10,000). Higher polymers CM PEI 150 and CM PEI 600 are both strongly rejected 95-99 percent by both membranes.

At a concentration of 0.1M chelated iron (III) output from an Amicon UM 2 membrane is about 1 gallon per square foot per day (GFD) with the polychelators of Table III at a pressure of 15 psi. For the PM 10 membrane, the output is 6-30 GFD. Output is strongly dependent upon iron concentration.

EXAMPLE 13

Adsorption of NO with Polymeric Chelate of Fe(II) and Separation

The polymeric chelate of Example 1 containing Fe(II) at a concentration of 0.025M in Fe(II) and 0.050M in $S_2O_3^=$ is dialyzed using a Spectrapor 6 membrane (2000 MW cut-off), area 4.5 cm$^2$. $Na_2SO_4$ (0.050M) is used as the dialysate solution. About 100 ml of dialysate is used. The permeability of the Fe(II)-chelate is $0.7 \times 10^{-2}$ cm/hr and for $S_2O_3^=$ is 0.6 cm/hr.

Additional permeabilities are obtained using the Fe(II) and Fe(III) chelate shown in Table V.

TABLE V
PERMEABILITIES OF IRON CHELATES AND THIOSULFATE THROUGH A DIALYSIS MEMBRANE
Spectrapor 6 membrane (2000 MW cut-off), Area = 4.5 cm$^2$

| Fe CHELATE | FEED Conc. M | $(S_2O_3^=)$ M | DIALYSATE ml | P, CM/HR. Fe | $S_2O_3^=$ |
|---|---|---|---|---|---|
| — | — | 0.10 | ~80 | — | 0.5 |
| Fe III-EDTA | 0.050 | 0.050 | ~90 | $22 \times 10^{-2}$ | 1.1 |
| Fe III-CME-100 | 0.025 | 0.050$^{(a)}$ | 100 | $0.7 \times 10^{-2}$ | 0.6 |
| Fe II-CME-100 | 0.025 | 0.050$^{(a)}$ | 100 | $3.6 \times 10^{-2}$ | 0.6 |
| Fe III-CM PEI 6 | 0.06 | — | 90 | $0.37 \times 10^{-2}$ | — |

$^{(a)}$0.050 M Na2SO4 used as dialysate solution; water used in other systems.

It is apparent from Table V that the polymeric chelates are not separated by dialysis through the membrane to the extent that the monomeric chelate is dialyzed.

EXAMPLE 13

Removal of NO and $SO_2$

A gas stream from an oil combustion unit having a concentration of NO of about 0.011 weight percent and $SO_2$ of about 0.03 weight percent enters a contact vessel which contains an aqueous solution containing about 1.0 percent by weight of iron (II) (based on the total weight of the mixture) as the polymeric chelate of carboxymethyl polyethyleneimine CM PEI 6. The chelate is supplied at 50 percent molar excess based on iron and the pH of the system is about 7. The pressure of the fluid gas is about 15 psig and the temperature of the reaction is about 55° C. A contact time of about 60 seconds is used. The NO and $SO_2$ are converted to $HN(SO_3)_2^=$, which remains in solution. The aqueous solution is then subjected to ultrafiltration using an Amicon UM 2 membrane and apparatus. The CM PEI 6 is retained in the aqueous solution while the low molecular weight water and $HN(SO_3)_2^=$ are separated. The retained aqueous solution containing the CM PEI 6 Fe(II) is recycled to the contact vessel.

EXAMPLE 14

Removal of NO and SO$_2$

The process scheme of FIG. 1 is used to treat a flue gas stream of about $2 \times 10^6$ SCFM containing about 326 ppm NO and about 1832 ppm SO$_2$. The flue gas is contacted with about 20,000 GPM of an aqueous stream containing about 5 weight percent concentration of CHELATE K of Example 8 of molecular weight about 20,000. About 90 percent of the NO and 99 percent of the SO$_2$ is removed from the flue gas. The aqueous stream containing chelate, imidodisulfonate, and other monomeric reaction products is then contacted with an Amicon polysulfone microporous ultrafiltration membrane possessing a molecular weight cut-off of about 10,000. A portion of the aqueous stream is obtained as permeate, to which lime is added to precipitate calcium sulfite, which is removed from the permeate by filtration. The filtered permeate is then combined with the non-permeate prior to contacting the combined non-permeate and filtered permeate stream with an Amicon polysulfone ultrafiltration membrane possessing a molecular weight cut-off of about 10,000. About 5-25 weight percent of the aqueous stream containing about 0 weight percent of the chelate, is withdrawn as permeate. The non-permeate is recycled back to the gas stream/aqueous stream contacting zone.

What is claimed is:

1. A cyclic process for the removal of NO$_x$ and SO$_x$ from a gas stream containing NO$_x$ and SO$_x$ comprising:
   (A) contacting the gas stream containing NO$_x$ and SO$_x$ in a contacting zone with an aqueous reaction solution comprising:
      an effective amount of an organic, water-soluble, polymeric chelate, wherein the chelate contains a polyvalent metal capable of absorbing NO$_x$, wherein the chelate possesses a molecular weight between about 500 and about 1,000,000, and wherein the chelate comprises a repeating polymeric chain backbone with pendant organic chemical groups capable of chelating the metal, under conditions such that NO$_x$ and SO$_x$ are substantially removed from the gas stream as imidodisulfonate, sulfite, and other monomeric reaction products in the aqueous solution;
   (B) separating the gas stream from which NO$_x$ and SO$_x$ have been substantially removed and the aqueous solution containing the chelate, imidodisulfate, sulfite, and other monomeric reaction products;
   (C) contacting the aqueous solution of step (B) with a first membrane separation means to obtain:
      (1) a first non-permeate stream, and
      (2) a first permeate stream,
         (a) adding an effective amount of calcium oxide to the first permeate stream, resulting in the precipitation of substantially all of the sulfite as calcium sulfite,
         (b) removing the precipitated calcium sulfite from the first permeate stream by filtration, and
         (c) combining the first permeate stream from which calcium sulfite has been precipitated and filtered with the first non-permeate stream;
      wherein the combined stream contains sufficient remaining sulfite for reaction in the contacting zone of step (A);
   (D) contacting the combined first permeate and first non-permeate stream with a second membrane separation means effective to remove as a second permeate stream a portion of the water and other monomeric reaction products which have a molecular weight of less than about 500 present in the combined first permeate and first non-permeate stream;
   (E) recycling the second non-permeate stream comprising concentrated chelate containing aqueous solution to the contacting zone of step (A); and
   (F) adding an effective amount of water-soluble alkali to the cyclic process.

2. The cyclic process of claim 1 wherein the first and second membrane separation means comprise dialysis or ultrafiltration.

3. The cyclic process of claim 2 wherein the first and second membrane separation means comprise ultrafiltration.

4. The cyclic process of claim 3 wherein the first and second membrane separation means comprise ultrafiltration wherein the ultrafiltration membranes possess a molecular weight cutoff of about 500 to about 30,000.

5. The cyclic process of claim 4 wherein the ultrafiltration membranes are fabricated from the group of polymers consisting of polysulfones, polyethersulfones, polyamides, cellulosic polymers, polyetherketones, polyolefins, polycarbonates, polyesters, and polyestercarbonates.

6. The cyclic process of claim 1 wherein in step (A) the polyvalent metal ion is selected from the group consisting of iron, copper, cobalt, and manganese.

7. The cyclic process of claim 1 wherein in step (A) the polyvalent metal is iron.

8. The cyclic process of claim 1 wherein the organic, water-soluble, polymeric chelate possesses a molecular weight of between about 1,000 and about 500,000.

9. A cyclic process for the removal of NO$_x$ and SO$_x$ from a gas stream containing NO$_x$ and SO$_x$ comprising:
   (A) contacting the gas stream containing NO$_x$ and SO$_x$ in a contacting zone with an aqueous reaction solution comprising:
      an effective amount of an organic, water-soluble, polymeric chelate, wherein the chelate contains a polyvalent metal capable of absorbing NO$_x$, wherein the chelate possesses a molecular weight between about 500 and about 1,000,000, and wherein the chelate comprises a repeating polymeric chain backbone with pendant organic chemical groups capable of chelating the metal, under conditions such that NO$_x$ and SO$_x$ are substantially removed from the gas stream as imidodisulfonate, sulfite, and other monomeric reaction products in the aqueous solution;
   (B) separating the gas stream from which NO$_x$ and SO$_x$ have been substantially removed and the aqueous solution containing the chelate, imidodisulfate, sulfite, and other monomeric reaction products;
   (C) contacting the aqueous solution of step (B) with a first membrane separation means to obtain:
      (1) a first non-permeate stream, and
      (2) a first permeate stream,
         (a) adding an effective amount of calcium oxide to the first permeate stream, resulting in the precipitation of substantially all of the sulfite as calcium sulfite, (b) removing the precipitated calcium sulfite from the first permeate stream by filtration, and
(c) combining the first permeate stream from which calcium sulfite has been precipitated and filtered with the first non-permeate stream;
wherein the combined stream contains sufficient remaining sulfite for reaction in the contacting zone of step (A);
(D) contacting the combined first permeate and first non-permeate stream with a second membrane separation means effective to remove as a second permeate stream a portion of the water and other monomeric reaction products which have a molecular weight of less than about 500 present in the combined first permeate and first non-permeate stream;
(E) recycling the second non-permeate stream comprising concentrated chelate containing aqueous solution to the contacting zone of step (A); and
(F) adding an effective amount of water-soluble alkali to the cyclic process;
wherein the chelate in step (A) is selected from the group of chelates consisting of:

$$-(CH_2-CH_2-N)_{\overline{m}}- \quad (a)$$
$$\quad\quad\quad\quad |$$
$$\quad\quad\quad\quad X_1$$

wherein
$X_1$ is independently in each occurrence —H, —CH$_2$COOH, —CH$_2$COOH, —CH$_2$CH$_2$COOH, —CH$_2$—P(=O)(OH)$_2$, or $-CH_2-\underset{HO\;\;R_2}{\overset{R_1}{\text{(phenyl)}}}$, wherein
$R_1$ and $R_2$ are independently in each occurrence —CH$_3$, —SO$_3$H, —Cl, —H, —COOH; and
m is an integer between about 5 and about 20,000;

$$-(CH_2-CH_2N)_{\overline{m}}- \quad (b)$$
$$\quad\quad\quad |$$
$$\quad\quad\quad X_2$$

wherein
$X_2$ is independently in each occurrence —H, —CH$_2$CH(OH)CH$_2$OH, —CH$_2$CH(OH)CH$_2$Cl, or $$\quad\quad | $$
$$\quad\quad CH_2 \quad\quad\quad R_4$$
$$\quad\quad | \quad\quad\quad\quad /$$
$$HO-CH-CH_2-(N-CH_2CH_2)_nN \quad ;$$
$$\quad\quad\quad\quad\quad |\quad\quad\quad\quad \backslash$$
$$\quad\quad\quad\quad\quad R_3 \quad\quad\quad\quad R_5$$

$R_3$, $R_4$ and $R_5$ are independently in each occurrence $X_1$, wherein $X_1$ is as defined hereinabove;

m is an integer between about 5 and about 20,000; and
n is 0, 1, 2, 3 or 4;

$$-(CH_2-CH-O)_{\overline{r}}- \quad (c)$$
$$\quad\quad\quad |$$
$$\quad\quad\quad CH_2$$
$$\quad\quad\quad |$$
$$\quad\quad\quad X_3$$

wherein
$X_3$ is independently in each occurrence —OH, —Cl, or $$\quad\quad\quad\quad\quad R_4$$
$$\quad\quad\quad\quad\quad /$$
$$(N-CH_2-CH_2)_s-N \quad ;$$
$$|\quad\quad\quad\quad\quad \backslash$$
$$R_3\quad\quad\quad\quad\quad R_5$$

$R_3$, $R_4$ and $R_5$ are as defined hereinabove;
r is an integer between about 10 and about 20,000, and
s is an integer between about 1 and about 4;

$$-(CH_2-CH)_{\overline{t}}- \quad (d)$$
$$\quad\quad\quad |$$
$$\quad\quad\quad C=O$$
$$\quad\quad\quad |$$
$$\quad\quad\quad X_4$$

wherein
$X_4$ is independently in each occurrence —OH, —OCH$_3$, —OCH$_2$CH$_3$, or $$\quad\quad\quad\quad R_3\quad\quad\quad\quad R_4$$
$$|\quad\quad\quad\quad |\quad\quad\quad\quad /$$
$$NH-(CH_2-CH_2-N)_{\overline{u}}CH_2-CH_2-N \quad ;$$
$$\quad\quad\quad\quad\quad\quad\quad\quad\quad\quad \backslash$$
$$\quad\quad\quad\quad\quad\quad\quad\quad\quad\quad R_5$$

$R_3$, $R_4$ and $R_5$ are as defined hereinabove;
t is an integer between about 10 and about 20,000, and
u is an integer between about 1 and about 4;

$$-(CH_2-CH)_{\overline{y}}- \quad (e)$$
$$\quad\quad\quad |$$
$$\quad\quad\quad \text{(phenyl)}$$
$$\quad\quad\quad |$$
$$\quad\quad\quad CH_2-X_5$$

wherein
$X_5$ is independently in each occurrence —OH, —Cl, or $$\quad\quad\quad\quad\quad\quad R_4$$
$$\quad\quad\quad\quad\quad\quad /$$
$$-(N-CH_2-CH_2)_{\overline{z}}-N \quad ;$$
$$|\quad\quad\quad\quad\quad\quad \backslash$$
$$R_3\quad\quad\quad\quad\quad\quad R_5$$

$R_3$, $R_4$ and $R_5$ are as is defined hereinabove;
y is an integer between about 10 and about 20,000, and
z is an integer between about 1 and about 4;

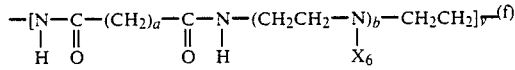

wherein $X_6$ is independently in each occurrence —H, —CH$_2$CH(OH)CH$_2$OH, —CH$_2$CH(OH)CH$_2$Cl, or

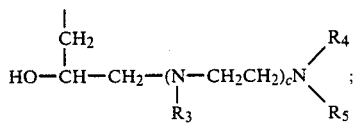

$R_3$, $R_4$ and $R_5$ are as defined hereinabove;

v is between about 10 to about 10,000, a is about 6, b is between about 1 and about 4, and c is between about 1 and about 4;

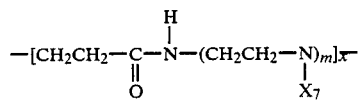

wherein $X_7$ is independently in each occurrence —H, —CH$_2$CH(OH)CH$_2$OH, —CH$_2$CH(OH)CH$_2$Cl, or

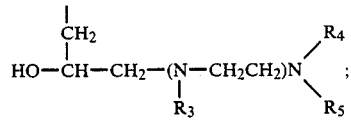

m, x, and n and $R_3$, $R_4$ and $R_5$ are as defined hereinabove; or

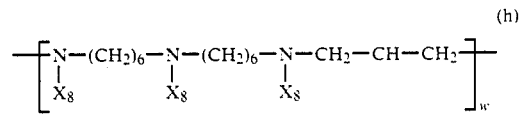

wherein $X_8$ is —H, —CH$_2$CH(OH)CH$_2$Cl, —CH$_2$CH(OH), or

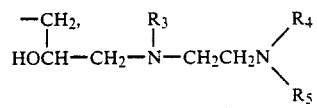

wherein $R_3$, $R_4$ and $R_5$ are as defined hereinabove; and w is between about 2000 and about 4000.

10. The cyclic process of claim 1 wherein step (A) occurs at temperatures between about 10° and about 90° C.

11. The cyclic process of claim 10 wherein the concentration of chelating groups in the aqueous reaction solution of step (A) is between about 0.01 and about 0.5M.

12. The cyclic process of claim 11 wherein steps (C) and (D) occur at temperatures between about 0° and about 90° C.

13. The cyclic process of claim 12 wherein in step (C) between about 15 and about 70 volume percent of the aqueous solution is obtained as the first permeate stream.

14. The cyclic process of claim 13 wherein in step (C) the amount of calcium oxide added to the first permeate stream is about 1 mole of calcium oxide to one mole of sulfite.

15. The cyclic process of claim 13 wherein in step (D) between about 5 and about 25 volume percent of the combined first permeate and first non-permeate stream is obtained as the second permeate stream.

* * * * *

UNITED STATES PATENT AND TRADEMARK OFFICE
CERTIFICATE OF CORRECTION

PATENT NO. : 4,910,002                                              Page 1 of 2
DATED      : March 20, 1990
INVENTOR(S): R. R. Grinstead It is certified that error appears in the above-identified patent and that said Letters Patent is hereby corrected as shown below:

On the title page, under "OTHER PUBLICATIONS", ninth line, after "Hydrophobic", "Membrane" has been misspelled;

Col. 1, line 55, delete "is" and insert -- in --;

Col. 5, line 68, after "or" delete "-$CH_2$,";

Col. 6, third line under "TABLE I", delete "driving" and insert -- drying --;

Col. 6 line 66, "polyethyleneimine" has been misspelled;

Col. 6, line 67, "phosphoric" has been misspelled;

Col. 7, line 42, delete "a ove" and insert -- above --;

Col. 8, line 12, "ethylenediamine" has been misspelled;

Col. 8, line 12, "the" has been misspelled;

UNITED STATES PATENT AND TRADEMARK OFFICE
CERTIFICATE OF CORRECTION

PATENT NO. : 4,910,002
DATED : March 20, 1990
INVENTOR(S) : R. R. Grinstead

It is certified that error appears in the above-identified patent and that said Letters Patent is hereby corrected as shown below:

Col. 8, line 15, "ethylenediamine" has been misspelled;

Col. 8, line 16, "triamine" has been misspelled;

Col. 8, line 16, delete "ahd" and insert -- and --;

Col. 11, line 14, "solution" has been misspelled;

Col. 11, line 53, after "kept" delete "to" and insert -- at --.

Signed and Sealed this

Seventeenth Day of March, 1992

Attest:

HARRY F. MANBECK, JR.

*Attesting Officer*     *Commissioner of Patents and Trademarks*